United States Patent
Kanevsky et al.

(10) Patent No.: US 11,201,785 B1
(45) Date of Patent: Dec. 14, 2021

(54) CLUSTER DEPLOYMENT AND MANAGEMENT SYSTEM

(71) Applicant: Dell Products L.P., Round Rock, TX (US)

(72) Inventors: Arkady Kanevsky, Cedar Park, TX (US); John H. Terpstra, Austin, TX (US); Mark S. Sanders, Roanoke, VA (US); Joseph LaSalle White, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 15/929,859

(22) Filed: May 26, 2020

(51) Int. Cl.
*H04L 29/08* (2006.01)
*H04L 12/24* (2006.01)
*G06F 16/27* (2019.01)

(52) U.S. Cl.
CPC .......... *H04L 41/0843* (2013.01); *G06F 16/27* (2019.01); *H04L 41/0806* (2013.01); *H04L 41/12* (2013.01); *H04L 67/34* (2013.01)

(58) Field of Classification Search
CPC ..... H04L 41/0843; H04L 67/34; H04L 41/12; H04L 41/0806; H04L 12/24; H04L 29/08; G06F 16/27
USPC ...................................... 709/222, 220; 713/1
See application file for complete search history.

(56) References Cited

U.S. PATENT DOCUMENTS

| | | | |
|---|---|---|---|
| 2011/0296067 A1* | 12/2011 | Weidenkeller | H04L 61/2038 710/110 |
| 2014/0086100 A1* | 3/2014 | Keesara | H04L 12/44 370/255 |
| 2014/0101467 A1* | 4/2014 | Jubran | H04L 41/0856 713/310 |
| 2016/0224277 A1* | 8/2016 | Batra | G06F 3/0653 |
| 2019/0146884 A1* | 5/2019 | Gangadharappa | G06F 3/065 711/162 |
| 2020/0310394 A1* | 10/2020 | Wouhaybi | H04L 67/1048 |
| 2021/0058338 A1* | 2/2021 | Liu | H04L 47/82 |

* cited by examiner

*Primary Examiner* — Tonia L Dollinger
*Assistant Examiner* — Mehulkumar J Shah
(74) *Attorney, Agent, or Firm* — Joseph Mencher (57) ABSTRACT

A cluster deployment and management system includes a networking device that is coupled to a network and to each of a plurality of node devices in a cluster system. The networking device discovers then validates using a cluster profile each of the plurality of node devices in the cluster system. The networking device may then configure itself and any other networking devices according to the cluster profile. The networking device may then configure each of the plurality of node devices according to the cluster profile and deploy one or more applications and data to the node devices. The networking device may negotiate which of at least two networking devices present on the network and may perform lifecycle management operations on the at least one of the node. The networking device performs lifecycle management on at least one of the node devices during operation of the cluster system.

20 Claims, 5 Drawing Sheets

CLUSTER DEPLOYMENT AND MANAGEMENT SYSTEM

BACKGROUND

The present disclosure relates generally to information handling systems, and more particularly to deployment and lifecycle management of a cluster of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems are sometimes provided via cluster systems that include a plurality of cluster nodes. For example, cluster nodes in a cluster system may include a separate physical server device, a storage device, a networking device, an accelerator device, a Graphical Processing Unit (GPU), and/or the combination of those devices in a Hyper-Converged Infrastructure (HCI) system. As will be appreciated by one of skill in the art, HCI systems provide a software-defined Information Technology (IT) infrastructure that virtualizes elements of conventional "hardware-defined" systems in order to provide virtualized computing (e.g., via a hypervisor), a virtualized Storage Area Network (SAN) (e.g., software-defined storage) and, in some situations, virtualized networking (e.g., storage-defined networking), any or all of which may be provided using commercial "off-the-shelf" server devices.

Some cluster systems utilize a complex set of cluster nodes in order to run modern, cloud-native, micro-service-based applications (e.g., a container cluster system). These cluster systems may include cluster nodes that provide computational and storage environments for supporting cloud native applications, and each cluster node in the cluster system may require its own set of configuration parameters for performing corresponding processing functions. Currently, each cluster node requires a manual configuration in order to provision roles, route access, storage connections, application allocations, and/or other configuration parameters that would be apparent to one of skill in the art in possession of the present disclosure. As such, provisioning and management of the configuration parameters for all the cluster nodes is complex, time consuming, and potentially prone to errors, and as the cluster system increases in size, the difficulty in configuring, managing, and maintaining the cluster system increases exponentially.

Furthermore, after the cluster system and its cluster nodes are configured and operational, the deployment of applications and services such as, for example, containerized applications, introduces additional challenges in cluster systems where the alignment of compute resources, storage, and network connectivity is required to ensure the reliability and the performance of the applications and services. Conventional cluster systems may include a deployment server that is allocated to function as the deployment control point for each cluster node within the cluster system, with the deployment server deploying applications, services, and data to the other cluster nodes and providing lifecycle management to the cluster system during its operation. As would be appreciated by one of skill in the art, lifecycle management may include operations such as updating firmware and embedded software in the cluster nodes, changing application and Basic Input/Output System (BIOS) settings, installation of operating system patches, updates, and upgrades, maintenance of run-time environment applications/software, installation, loading of a container management system and/or a virtual machine management system, and/or other lifecycle management operations known in the art.

However, while the deployment server can provide for the deployment of applications and services to the cluster system, when the cluster node(s) that provide networking resources and connectivity are unavailable to the other cluster nodes, the deployment server is unable to complete the deployment operations, and lacks connectivity to a management console. Furthermore, inclusion of the additional deployment server to perform deployment operations utilizes additional rack-space and adds additional cost to the cluster system. Further still, the deployment server itself requires lifecycle management, resulting in a "chicken or egg" paradox as the deployment server cannot manage its own lifecycle without disrupting the operation of the entire cluster system.

Accordingly, it would be desirable to provide a cluster deployment and management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a cluster deployment and management engine that is configured to: discover each of a plurality of node devices in a cluster system; validate each of the plurality of node devices in the cluster system using a cluster profile; configure each of the plurality of node devices according to the cluster profile; and deploy one or more applications and data to at least one of the node devices included in the plurality of node devices.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
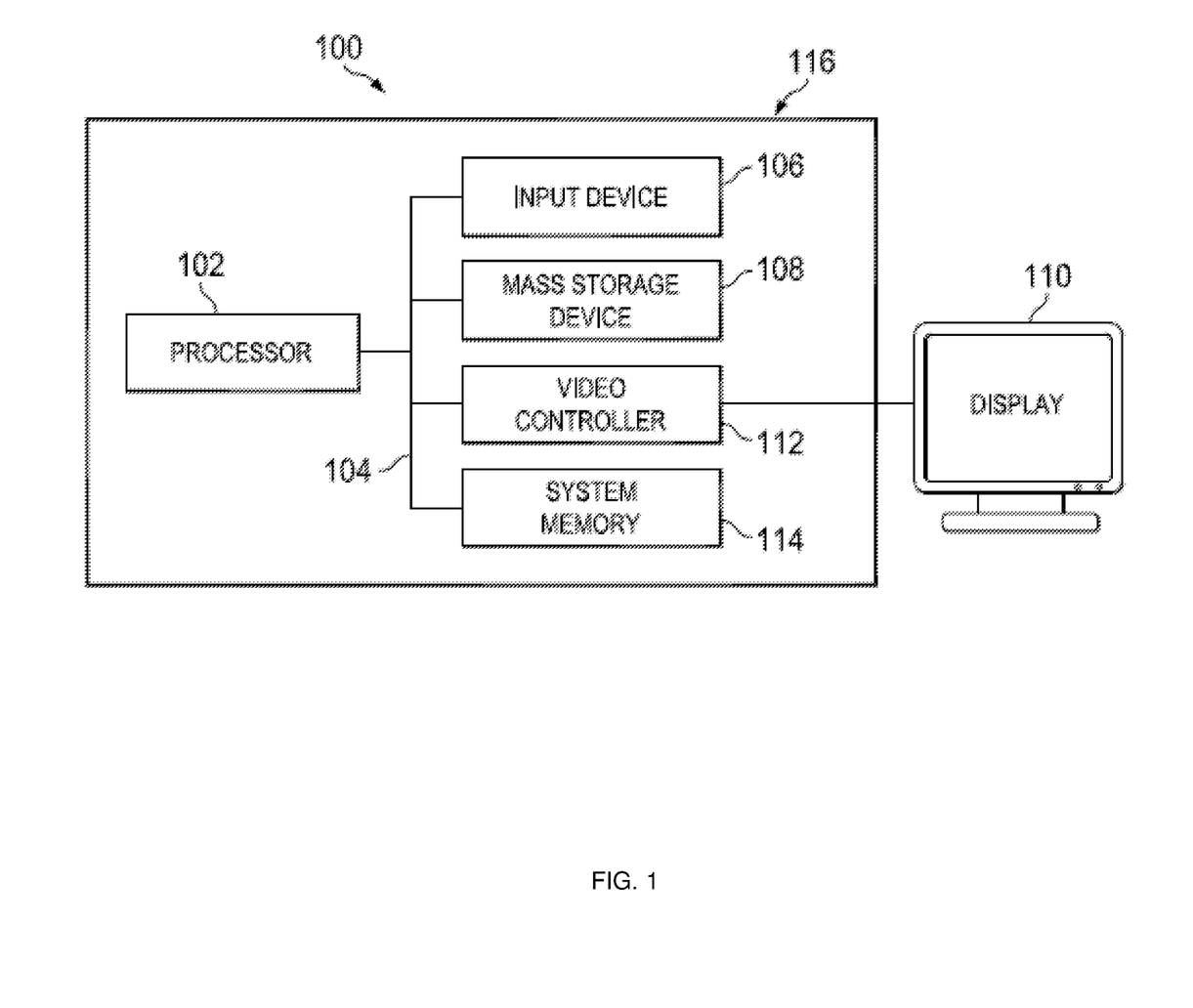
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
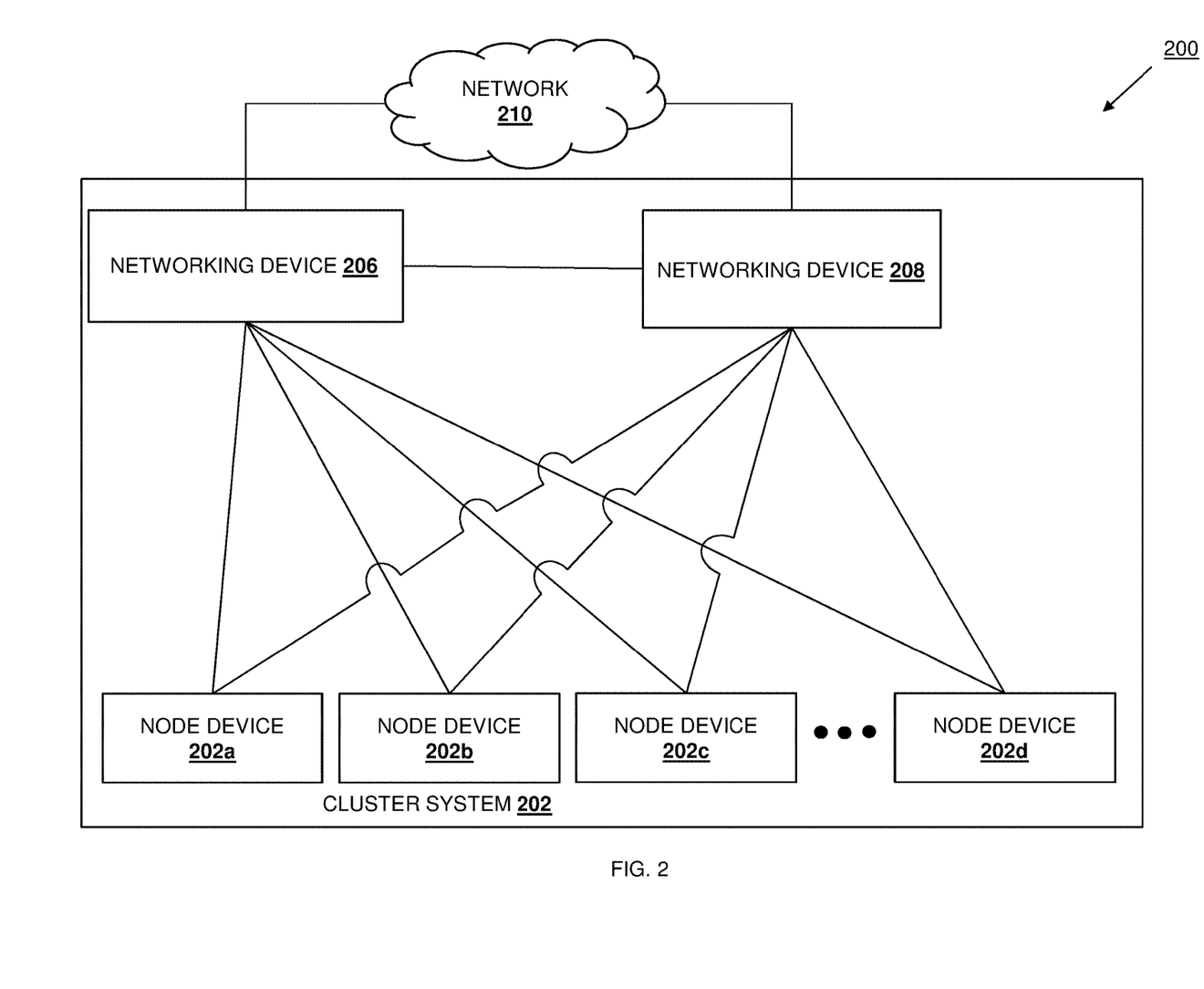
FIG. 2 is a schematic view illustrating an embodiment of a cluster deployment and management system.

Referring now to FIG. 2, an embodiment of a cluster deployment and management system 200 is illustrated. As will be appreciated by one of skill in the art in possession of the present disclosure, the cluster deployment and management system 200 of the present disclosure may include one or more cluster systems such as the cluster system 202 illustrated in FIG. 2. In the illustrated embodiment, the cluster system 202 includes a plurality of node devices 202a, 202b, 202c, and up to 202d. In an embodiment, any or all of the node devices 202a-202d may be provided by the IHS 100 discussed above with reference to FIG. 1, and/or may include some or all of the components of the IHS 100. In some examples, the cluster system 202 may be provided by Hyper-Converged Infrastructure (HCI) systems, with each of the node devices 202a-202d provided by storage-dense server devices. However, in other examples, the node devices 202a-202d may be provided by a server device (e.g., a server computing device), a networking device (e.g., a switch, a router, a gateway, etc.), an accelerator device, a Graphical Processing Unit (GPU) device, a storage device (e.g., an array of Solid-State Drives (SSDs), an array of Hard Disk Drives (HDDs), etc.) and/or any other computing device that one of skill in the art in possession of the present disclosure would recognize may provide a cluster node device that is distinct from other cluster node devices in a cluster system. However, one of skill in the art in possession of the present disclosure will recognize that cluster systems and node devices provided in the cluster deployment and management system 200 may include any types of cluster systems, devices, and/or applications that may be configured to operate similarly as discussed below.

In the illustrated embodiment, a pair of networking devices 206 and 208 are coupled to each of the node devices 202a-202d included in the cluster system 202. As would be appreciated by one of skill in the art, the networking device 206 and/or the networking device 208 may be cluster node devices included in the cluster system 202. In an embodiment, either or both of the networking devices 206 and 208 may be provided by the IHS 100 discussed above with reference to FIG. 1, and/or may include some or all of the components of the IHS 100. For example, the networking devices 206 and 208 may be provided by Top Of Rack (TOR) switch devices, although other switch devices and/or networking devices may fall within the scope of the present disclosure as well. While a pair of networking device 206 and 208 are illustrated, one of skill in the art in possession of the present disclosure will recognize that a single networking device may be provided in the cluster deployment and management system 200 or more than two networking devices may be provided in the cluster deployment and management system.

As illustrated in FIG. 2, the networking device 206 and the networking device 208 may be coupled to a network 210 (e.g., a Local Area Network (LAN), the Internet, combinations thereof, etc.). As will be appreciated by one of skill in the art in possession of the present disclosure, the illustrated embodiment of the cluster deployment and management system 200 provides an example of "highly available" edge-based cluster system that utilizes a pair of redundant networking devices 206 and 208 that may each operate to ensure network connectivity for the cluster system 202 in the event of the failure or unavailability of the other networking device. Furthermore, and as would be understood by one of skill in the art in possession of the present disclosure, the networking devices 206 and 208 may be associated with a data plane in which the networking devices 206 and 208 essentially operate as a single switch device. Further still, the networking processing systems (discussed below) in the networking devices 206 and 208 may perform a variety of switch fabric management functionality, as well as any other functionality that would be apparent to one of skill in the art in possession of the present disclosure. While a specific cluster deployment and management system 200 has been illustrated and described, one of skill in the art in possession of the present disclosure will recognize that the cluster deployment and management system of the present disclosure may include a variety of components and component configurations while remaining within the scope of the present disclosure as well.

Figure 3:
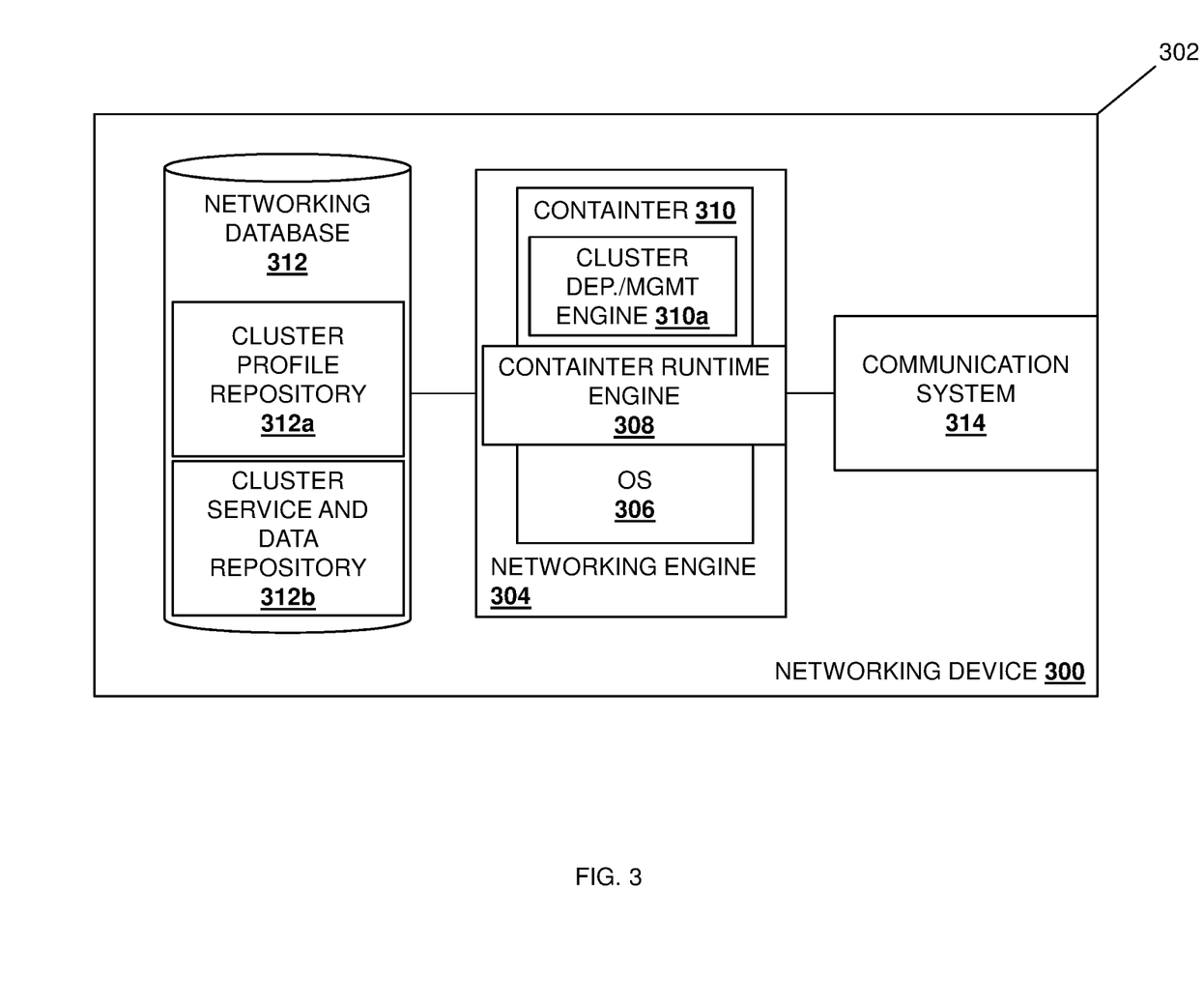
FIG. 3 is a schematic view illustrating a networking device that may be provided in the cluster deployment and management system of FIG. 2.

Referring now to FIG. 3, an embodiment of a networking device 300 is illustrated that may be the networking device 206 and/or the networking device 208 discussed above with reference to FIG. 2. As such, the networking device 300 may be the IHS 100 discussed above with reference to FIG. 1, and/or may include some or all of the components of the IHS 100. As discussed above, while the networking device 300 is described as being provided by a networking switch, the networking device 300 may be provided by a router, a gateway, and/or a variety of networking devices that would be apparent to one of skill in the art in possession of the present disclosure. In the illustrated embodiment, the networking device 300 includes a chassis 302 that houses the components of the networking device 300, only some of which are illustrated in FIG. 3. For example, the chassis 302 may house a processing system (not illustrated, but which may be provided by the processor 102 discussed above with reference to FIG. 1) and a memory system (not illustrated, but which may be provided by the memory 114 discussed above with reference to FIG. 1) that includes instructions that, when executed by the processing system, cause the processing system to provide a networking engine 304 that is configured to perform the functionality of the networking engines and/or networking devices discussed below.

In the illustrated embodiment, the networking engine 304 includes an operating system 306 and a container runtime engine 308 that are configured to perform the functions of the networking engines, operating systems, container engines, and/or networking devices discussed below. In the illustrated example, the container runtime engine 308 (e.g., a container engine available from Docker®/Docker Swarm® (currently available at http//wwww.docker.com), Rancher®, Windows Server 2016 Containers, and/or other container APIs known in the art) may have generated one or more containers (e.g., the container 310 illustrated in FIG. 3) for the operating system 306. For example, the container 310 generated by the container runtime engine 308 may be provided by isolated user-space virtualization instances that run on top of the operating system 306, and may be provisioned from a container image which specifies one or more prerequisites that a container requires to process a job for which the container is being provisioned. In an embodiment, the container 310 may be configured with an agent such as a cluster deployment and management engine 310a that is configured to perform the functions of the cluster deployment and management engines and/or the networking devices discussed below. As would be appreciated by one of skill in the art, the cluster deployment and management engine 310a may be provided by a third-party or may include third-party code. The use of a container 310 to deploy the cluster deployment and management engine 310a keeps the operations of the cluster deployment and management engine 310a separate from the instructions used by the networking engine 304 for networking operations and makes it possible to update or replace the cluster deployment and management engine 310a without impacting the networking operations of the networking device. However, while the cluster deployment and management engine 310a is illustrated as being provided in a container environment (e.g., the container 310), one of skill in the art in possession of the present disclosure may recognize that the cluster deployment and management engine 310a may be a module that is provided by the networking engine 304, or via its own distinct operations that are separate from the networking engine 304.

In a specific example, the networking engine 304 may be provided by networking processing system (e.g., Networking Processing Unit (NPU)) in the networking device 300 that is configured to transmit data traffic between the network 210 and the node devices 202a-202d in the cluster system 202, discussed above with reference to FIG. 2, using a variety of data traffic network transmission techniques that would be apparent to one of skill in the art in possession of the present disclosure. In a specific example, the operating system 306, the container runtime engine 308, and/or the cluster deployment and management engine 310a may be provided by a central processing system (e.g., a Central Processing Unit (CPU)) in the networking device 300 that is configured to run applications for the networking device 300.

The chassis 302 may also house a storage device (not illustrated, but which may be the storage device 108 discussed above with reference to FIG. 1) that is coupled to the networking engine 304 (e.g., via a coupling between the storage device and the processing system) and that includes a networking database 312 that is configured to store the rules and/or any other data utilized by the networking engine 304 and/or the cluster deployment and management engine 310a in order to provide the functionality discussed below. In an embodiment, the networking database 312 includes a cluster profile repository 312a that stores one or more cluster profiles, and the networking database 312 includes a cluster service and data repository 312b that stores cluster data, cluster micro-services, cluster applications, and/or any other information that may be used to perform a variety of deployment functionality that one of skill in the art in possession of the present disclosure would recognize enables the cluster system to service a workload.

The chassis 302 also houses the communication system 314 that is coupled to the networking engine 304 and/or the cluster deployment and management engine 310a (e.g., via a coupling between the communication system 314 and the processing system), and that may include a network interface controller (NIC), programmable Smart NIC, a wireless communication subsystem, and/or other communication subsystems known in the art. While the cluster profile repository 312a and the cluster service and data repository 312b are illustrated as stored in the networking database 312 that is housed in the chassis 302, one of skill in the art in possession of the present disclosure will recognize that the cluster profile repository 312a and/or the cluster service and data repository 312b may be stored in a storage device that is located outside the chassis 302 and that is accessible to the networking engine 304 and/or the cluster deployment and management engine 310a through a network (e.g., the network 210 of FIG. 2) via the communication system 314. As will be appreciated by one of skill in the art in possession of the present disclosure, the storage device and communication system 314 may enable the networking engine 304 and/or the cluster deployment and management engine 310a included in the networking device 300 to access the cluster profile repository 312a and/or the cluster service and data repository 312b without having to store that cluster profile repository 312a and/or the cluster service and data repository 312b directly on the networking device 300. However, while specific components of the networking device 300 have been illustrated and described, one of skill in the art in possession of the present disclosure will recognize that other components may be included in the chassis 302 and utilized to perform the functionality described below, as well as conventional networking device (e.g., a conventional network switch functionality), while remaining within the scope of the present disclosure.

Figure 4:
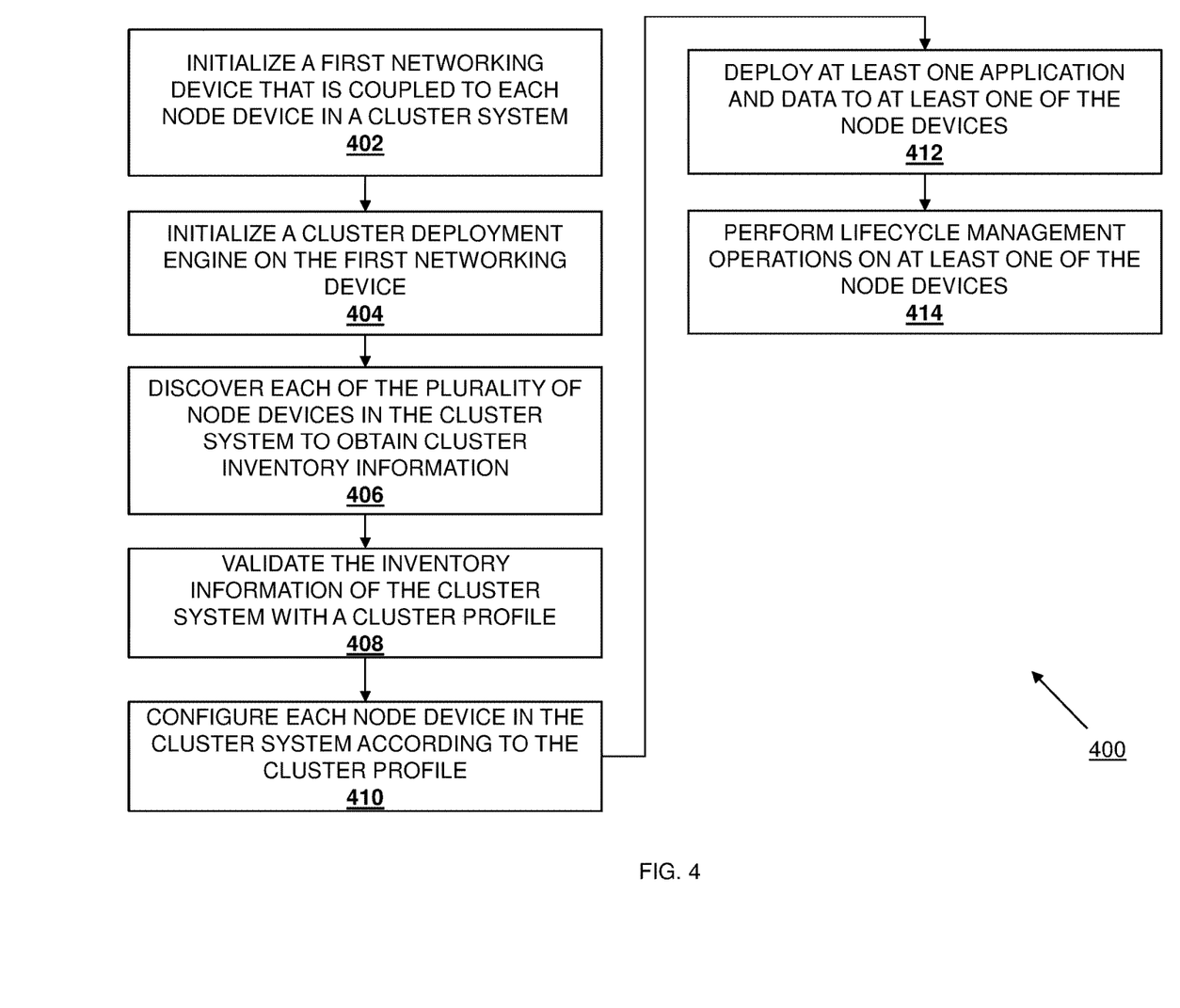
FIG. 4 is a flow chart illustrating an embodiment of a method for deploying and managing a cluster system.

Referring now to FIG. 4, an embodiment of a method 400 for deploying and managing a cluster system is illustrated. As discussed below, the systems and method of the present disclosure may provide a cluster deployment and management application on a cluster node in a cluster system that is provided by a networking device such as a switch device, with the cluster deployment and management application operating to deploy applications, services, and data on other cluster nodes in the cluster system. The networking device may be preconfigured and may include a validated operating system, as well as networking connectivity resources for interconnecting the cluster nodes (e.g., servers, accelerators, storage, networking devices, and/or other device included in the cluster system), and thus may be used and managed subsequent to being powered on. The cluster deployment and management application may be executed when the networking device is active and, in some embodiments, the cluster deployment and management application may be provided by a container that is activated or "spun up" on the preconfigured operating system running on the networking device. Upon activation, the cluster deployment and management application may begin cluster node discovery operations that gather inventory information associated with the cluster nodes included in the cluster system in order to determine a cluster configuration and to validate the cluster configuration against a cluster configuration profile. The cluster deployment and management application may then provision the cluster nodes with roles, states, and storage allocations that are specified in the cluster configuration profile, followed by its automatic deployment of applications, services, and data that are required for the cluster system and cluster nodes to operate.

As such, a networking device may be provided in a cluster system as a control point for cluster deployment and management to eliminate the requirement of a separate server in the cluster system for the control operations. Furthermore, a boot sequence of a networking device may operate to update a container image prior to the initiation of the cluster deployment and management application in the networking switch, which allows the use of the container to perform lifecycle management on the networking device prior to the cluster deployment and management application gathering inventory information for the cluster nodes included in the cluster system. Further still, a second networking device may be included in the cluster system for redundancy purposes, and that second networking device may mirror a primary networking device, which allows the secondary networking device to provide the cluster deployment and management application to the cluster system if the primary networking device requires any lifecycle management during the operation of the cluster system, and eliminates the "chicken or egg" paradox discussed above that is present in conventional cluster deployment and management servers.

The method 400 begins at block 402 where a first networking device that is coupled to one or more cluster nodes in a cluster system is initialized. In an embodiment, at block 402, the networking device 206/300 may initialize when power is provided to the networking device 206/300. In an embodiment, the networking device 206/300 may be preconfigured and may include a validated operating system and, during the initialization of the networking device 206/300, a Basic Input/Output System (BIOS) (not illustrated) in the networking device 206/300 may perform a boot sequence. In an embodiment, the boot sequence may update any container images, such as the container image for the container 310 that runs the cluster deployment and management engine 310a, which as discussed above may be stored in the networking database 312 or accessible via the network 210.

The method 400 then proceeds to block 404 where the first networking device initializes a cluster deployment and management engine. In an embodiment, at block 404, the networking device 206/300 may initialize the cluster deployment and management engine 310a. For example, during runtime, the container runtime engine 308 running on the operating system 306 may generate a container 310 that includes the cluster deployment and management engine 310a from the container image stored in the networking database 312. Following the initialization of the cluster deployment and management engine 310a, the cluster deployment and management engine 310a may perform lifecycle management operations on the networking device 206/300 that may include any firmware updates, BIOS updates, operating system updates, and/or any other lifecycle management operations that would be apparent to one of skill in the art in possession of the present disclosure.

The method 400 then proceeds to block 406 where the first networking device discovers each of the plurality of node devices in the cluster system in order to obtain cluster inventory information. In an embodiment, at block 406, the cluster deployment and management engine 310a may perform cluster node discovery operations. For example, the cluster deployment and management engine 310a may utilize Address Resolution Protocol (ARP), Dynamic Host Configuration Protocol (DHCP), Simple Network Management Protocol (SNMP), User Datagram Protocol-based Data Transfer Protocol (UDT), and/or other discovery/communication protocols that would be apparent to one of skill in the art to discover the node devices 202a-202d and/or the networking device 208 included in the cluster system 202. In other examples, the cluster deployment and management engine 310a may simply query the networking engine 304 to enumerate devices that are attached to each of its ports. In yet other examples, the cluster node discovery may be accomplished via an Intelligent Platform Management Interface (IPMI), a Remote Access Controller (RAC) (e.g., an Integrated Dell Remote Access Controller (iDRAC) or a Baseboard Management Controller (BMC) and/or by introspection tools. As a result of the cluster node discovery operations, the cluster deployment and management engine 310a on the networking device 206/300 may discover the node devices 202a-202d and/or the networking device 208 included in the cluster system 202.

In an embodiment, the performance of the cluster node discovery operations may include the cluster deployment and management engine 310a generating inventory information about the cluster system 202 that may include a node device type of each of the node device 202a-202d and/or the networking device 208 (e.g., a server device, a networking device, a storage device, a GPU, an accelerator device, and/or other devices known in the art), the capabilities of each of the node device 202a-202d and/or the networking device 208, a topology of the node devices 202a-202d and/or the networking device 208, configuring the order of Network Interface Controllers (NIC) for remote booting of each server device and/or any other node device information and cluster system information that would be apparent to one of skill in the art in possession of the present disclosure. In various embodiments, the performance of node discovery operations may be introspected using a discovery protocol to enumerate the configuration of firmware and components in the node devices 202a-202d in the cluster system 202. The information that is gleaned from node device introspections may be used to determine any change of state that must be established to declare that the node device is ready for the next state transition operation to proceed.

The method 400 then proceeds to block 408 where the first networking device determines whether the inventory information for the cluster system and a cluster profile indicate that the cluster system is valid. In an embodiment, at block 408, the cluster deployment and management engine 310a may validate the inventory information for the cluster system 202 with a cluster profile that is stored in the cluster profile repository 312a. For example, at block 408 the cluster deployment and management engine 310a may compare the inventory information obtained in block 406 to inventory information stored in each cluster profile in the cluster profile repository 312a. in an embodiment, in order for the inventory information for the cluster system 202 to be validated, the inventory information for the cluster system 202 must match (or substantially match by, for example, satisfying a predetermined condition of similarity with) the inventory information included in a cluster profile. If the inventory information for the cluster system 202 does not match the inventory information in any of the cluster profiles in the cluster profile repository 312a, the cluster deployment and management engine 310a may invalidate the cluster system 202, and a notification may be sent by the cluster deployment and management engine 310a to an administrator via the network 210. However, in some examples in which a match does not occur, the cluster deployment and management engine 310a may select a cluster profile from the cluster profile repository 312a that is the most similar to the inventory information of the cluster system 202, or may build a cluster profile based on a master cluster profile stored in the cluster profile repository 312a and convergence rules provided in that master cluster profile.

The method 400 then proceeds to block 410 where the first networking device configures each of the plurality of node devices included in the cluster system according to the cluster profile. In an embodiment, at block 410, the cluster deployment and management engine 310a may retrieve a cluster configuration from the cluster profile that was used to validate the cluster system 202 in block 408. For example, the cluster configuration may include configurations for the node devices 202a-202d and/or the networking device 208, and the cluster deployment and management engine 310a may configure the node device 202a-202d and/or the networking device 208 using the cluster configuration. In a specific example, the cluster deployment and management engine 310a may assign roles and services to the node devices 202a-202d defined in the cluster configuration. For example, the cluster deployment and management engine 310a may assign a switch device as a TOR switch, a leaf-spine switch, or as a core switch. In other examples, the cluster deployment and management engine 310a may assign a server device as a control plane device, as a compute node, as a storage node, or as a Host Controller Interface (HCI) node. In yet other examples, a NIC may be assigned to a function as a leaf switch or as a network connection for storage or a GPU. In any of these roles, the node devices may further be assigned sub-functional roles as required during initial deployment of the cluster system 202, during initialization of the cluster system 202, and/or as part of a persistent or temporal role necessary for part or all of the service life of the cluster system 202.

In other specific examples of the cluster configuration, the cluster deployment and management engine 310a may allocate storage resources included in the node devices 202a-202d in at least one of the node devices 202a-202d, with the storage resources assigned based on applications and workloads that are to be run on the cluster system 202. In various embodiments, subsequent to or during the configuration of the each of the node devices 202a-202d and/or the networking device 208, the cluster deployment and management engine 310a may deploy a container infrastructure on at least one of the node devices 202a-202d. For example, container engines and/or virtual machine engines that are configured to provide containers and/or virtual machines, respectively, for the various applications that are to operate on the cluster system 202 may be deployed on the various node device 202a-202d (e.g., the servers, GPUs, accelerators, and/or other device). However, while specific cluster configurations are described, one of skill in the art in possession of the present disclosure will recognize that other cluster configurations may be applied to the cluster system 202 without remaining within the scope of the present disclosure as well.

The method 400 then proceeds to block 412 where the first networking device deploys one or more applications and data to at least one of the node devices included in the plurality of node devices. In an embodiment, at block 412, the cluster deployment and management engine 310a may deploy one or more applications and data to the node device 202a-202d and/or the networking device 208, and those applications and/or data may be obtained from the cluster service and data repository 312b. In a specific example, the cluster deployment and management engine 310a may access the cluster service and data repository 312b to obtain micro-service functions, application functions, data for those micro-service functions and application functions, and/or any other data and applications that would be apparent to one of skill in the art in possession of the present disclosure. As such, the networking device 206/300 may provide a control point for the node devices 202a-202d when deploying applications, services, and/or data. As discussed above, the cluster service and data repository 312b may be provided on the networking database 312 housed in the networking device 300 and/or connected to the networking engine 304 via a local connection and/or the network 210. Furthermore, during block 412, any virtual machine and/or container that hosts the applications and/or services may be deployed on the container infrastructure as well, and upon completion of block 412, the cluster system 202 may be operational such that it is running the services and applications on the cluster system 202.

The method 400 then proceeds to block 414 where the first networking device performs lifecycle management operations on at least one of the node devices. In an embodiment, at block 414, the cluster deployment and management engine 310a may perform any of a variety of lifecycle management operations on the node devices 202a-202d and/or the networking device 208. Furthermore, as discussed below with reference to the method 500 of FIG. 5, the cluster deployment and management engine 310a on the networking device 206/300 may also perform lifecycle management operations upon itself. As discussed above, during operation of the cluster system 202, the cluster deployment and management engine 310a on the networking device 206 may perform lifecycle management operations including, for example, the updating of firmware and embedded software on the nodes device 202a-202d and/or the networking device 208, the changing of application and Basic Input/Output System (BIOS) settings on the nodes device 202*a*-202*d* and/or the networking device 208, the installation of operating system patches, updates, and/or upgrades on the nodes device 202*a*-202*d* and/or the networking device 208, the maintenance of run-time environment applications/software on the nodes device 202*a*-202*d* and/or the networking device 208, the installation and loading of a container management system and/or a virtual machine management system on the cluster system 202, configuring switch device for overlay as required for clustering platform to be deployed on other node devices (e.g., setting up VLANS that the cluster management and deployment engine 310*a* will use and one or more VLANS that cluster management and deployment engine 310*a* will assign to users of the cluster system 202, and/or other lifecycle management operations that would be apparent to one of skill in the art in possession of the present disclosure. In some embodiments, at block 414, the networking device 208 may receive the lifecycle management operations via the network 210 from a management terminal and/or from various third-party providers.

Figure 5:
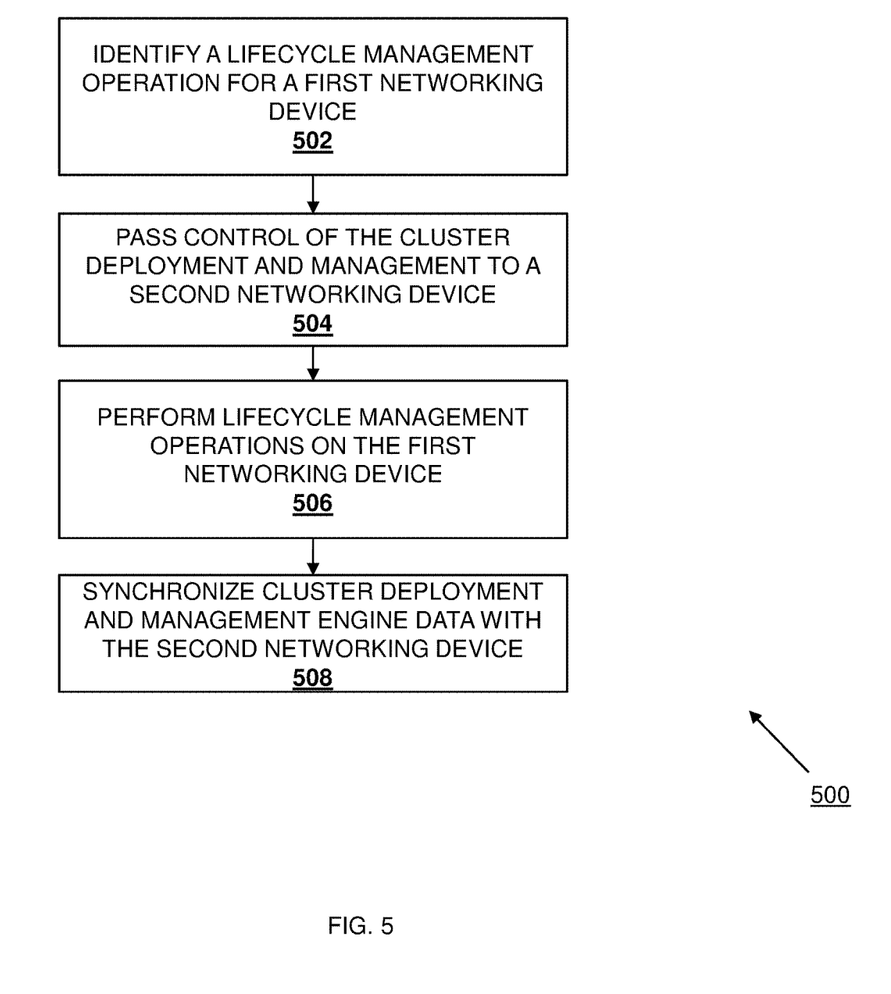
FIG. 5 is a flow chart illustrating an embodiment of a method for performing lifecycle management on a networking device that deploys and manages a cluster system according to the method of FIG. 4.

Referring now to FIG. 5, an embodiment of a method 500 for performing lifecycle management on a first networking device is illustrated. The method 500 begins at block 502 where the first networking device identifies a lifecycle management operation that is required for the first networking device. In an embodiment, at block 502, the cluster deployment and management engine 310*a* on the networking device 206/300 may receive a lifecycle management operation for the networking device 206/300. For example, the networking device 206/300 may receive the lifecycle management operation via the network 210. As would be recognized by one of skill in the art in possession of the present disclosure, in conventional cluster systems where a server device included the cluster system 202 provides lifecycle management functions and cluster deployment, such lifecycle management operations would require that the server device restart or shut down, which in turn requires that the entire cluster system restart and be reconfigured. For example, the server device may require a firmware update, reconfiguration of firmware of BIOS settings, redeployment of hosted operating system components, rebuilding of hosted application containers or components, and/or simple redeployment of services that the server device provides within the cluster framework.

However, in cluster system of the present disclosure, the method 500 proceeds to block 504 where the first networking device passes control of the cluster deployment and management to a second networking device. In an embodiment, at block 504, the cluster deployment and management engine 310*a* on the networking device 206/300 may pass control to the cluster deployment and management engine 310*a* on the networking device 208/300. As discussed above, cluster systems such as the cluster system 202 often require redundant networking devices to maintain connectivity to a network such as the network 210 in the event that a primary networking device fails. As such, during operation, the networking device 206 and the networking device 208 may perform elections operations to elect the networking device 206 as a primary networking device such that the networking device 208 is designated as a secondary networking device. The election of the primary networking device may include the selection of the networking device 206/300 as the networking device to handle the cluster deployment and management engine 310*a*. However, the selection of the networking device 206/300 may have been auto-negotiated between the networking device 206 and 208 using an intelligent algorithm that assures that only one of them will own this role for the duration of a deployment stream. Furthermore, the networking devices 206 and 208 may be aggregated to form Link Aggregation Groups (LAG), as well as virtualized as a virtual networking device that the other nodes devices 202*a*-202*d* included in the cluster system 202 recognize as a single networking device provided by the aggregated networking devices 206 and 208.

The aggregation of networking devices or the provisioning of redundant networking devices also requires synchronization of the networking devices such that, if the primary networking device fails or otherwise becomes unavailable, the secondary networking device can resume operations for the primary networking device without disruption to network connectivity and services. As such, the networking device 206 and the networking device 208 may perform synchronization operations via their respective networking engines 304, and those synchronization operations may cause the networking device 208/300 to deploy the cluster deployment and management engine 310*a* as it is deployed on the networking device 206/300 such that the cluster deployment and management engine 310*a* remains available should the networking device 206/300 become unavailable or require a lifecycle management operation.

In an embodiment, at block 504, when the cluster deployment and management engine 310*a* on the networking device 206/300 detects that a lifecycle management operation is required for the networking device 206/300, the cluster deployment and management engine 310*a* on the networking device 206/300 may signal to the cluster deployment and management engine 310*a* on the networking device 208/300 to take control of cluster deployment and management. For example, the signal provided by the networking device 206/300 may include a notification sent to the networking device 208/300, or a lack of signal (e.g., a lack of a heartbeat message) when the networking device 206 shuts down or otherwise becomes unavailable. The networking engine 304 on the networking device 208/300 may then operate to take over the primary networking device role for the networking engine 304 on the networking device 206/300, and subsequently provide the network functionality for the cluster system 202. As such, the cluster deployment and management engine 310*a* on the networking device 208/300 may take control of the lifecycle management and the cluster deployment for the cluster system 202.

The method 500 then proceeds to block 506 where the lifecycle management operations are performed on the first networking device. In an embodiment, at block 506, the lifecycle management operations may be performed on the networking device 206/300. For example, the cluster deployment and management engine 310*a* on the networking device 208/300 may take control of the lifecycle management for the cluster system 202 that was previously managed by the cluster deployment and management engine 310*a* on the networking device 206/300, and the cluster deployment and management engine 310*a* on the networking device 208/300 may then assist in the performance of the lifecycle management operations on the networking device 206/300 while the networking device 206/300 is being updated with any lifecycle management operations.

The method 500 then proceeds to block 508 where the first networking device synchronizes cluster deployment and management engine data with the second networking device. In an embodiment, at block 508, the networking engine 304 on the networking device 206/300 may synchronize with the networking engine 304 on the networking device 206/300 after the lifecycle management operations are performed on the networking device 206/300. For example, the synchronization may include synchronizing cluster deployment and management engine data between the networking device 206/300 and the networking device 208/300. As such, the networking engine 304 on the networking device 208/300 may provide any cluster deployment and management engine data for the cluster deployment and management engine 310a to the networking engine 304 on the networking device 206/300 so that the cluster deployment and management engine 310a on the networking device 208/300 mirrors the cluster deployment and management engine 310a on the networking device 206/300. In various embodiments, control of the cluster system 202 may revert to the cluster deployment and management engine 310a on the networking device 206/300 once the networking device 206/300 has completed the lifecycle management operations. However, in other embodiments, the networking device 206/300 may be designated as the secondary networking device while the networking device 208/300 remains the primary networking device and in control of the deployment and management of the cluster system 202.

Thus, systems and methods have been described that provide a cluster deployment and management application on a switch device in a cluster system. The cluster deployment and management engine may be initialized on a container on the switch device, and may provide for the discovery of node devices in the cluster system, the validation of the discovered node devices, the configuration of the node devices including the assignment and deployment of roles, services, and allocation of storage to the roles and services, the deployment of applications on a container and/or virtual machine infrastructure, and/or a variety of lifecycle management operations known in the art. The cluster deployment and management engine may also configure and perform lifecycle management operations for the switch device prior to the cluster deployment and management application configuring the cluster system. In many embodiments, the cluster system may also include a redundant switch device that synchronizes with the "primary" switch device that provides the cluster deployment and management application such that the redundant switch device may control networking functionality and cluster deployment and management functionality in the event lifecycle management operations are performed on the primary switch device. As such, the systems and methods of the present disclosure eliminate a need for a separate server device that performs cluster deployment and management, as is required in conventional cluster systems. Furthermore, by passing control of the lifecycle management operations to a redundant switch device, the systems and methods of the present disclosure allow for the performance of lifecycle management operations on a primary switch device on which the cluster deployment and management application is provided, resulting in the cluster system experiencing little to no downtime during primary switch device lifecycle management operations. Further still, by providing the cluster deployment and management on the switch device, network connectivity for the cluster system is provided when the switch device is initialized, which allows for remote management of the cluster deployment and management application when the cluster deployment and management application becomes available.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method of cluster deployment and management, comprising:
    discovering, by a first switch device included in a cluster system, each of a plurality of node devices that are included in the cluster system and that are coupled to the first switch device;
    validating, by the first switch device, each of the plurality of node devices in the cluster system using a cluster profile;
    configuring, by the first switch device, each of the plurality of node devices according to the cluster profile;
    deploying, by the first switch device, one or more applications and data to at least one of the node devices included in the plurality of node devices;
    performing, by the first switch device, network switch functionality on data traffic transmitted between the plurality of node devices and a network;
    receiving, by the first switch device and subsequent to the transmission of data traffic between the plurality of node devices and the network, a lifecycle management operation that is to-be performed to the first switch device and that will cause the first switch device to restart; and
    performing, by the first switch device, the lifecycle management operation on the first switch device without restarting or reconfiguring any of the plurality of node devices in the cluster system.

2. The method of claim 1, further comprising:
    performing, by the first switch device, lifecycle management operations on at least one of the node devices.

3. The method of claim 1, further comprising:
    assigning, by the first switch device, a role to at least one of the node devices included in the plurality of node devices;
    allocating, by the first switch device, storage resources in at least one of the node devices included in the plurality of node devices to at least one application deployed on that node device; and
    deploying, by the first switch device and prior to the deploying the one or more applications and the data to the at least one of the node devices included in the plurality of node devices, a container infrastructure on the at least one of the node devices to which the storage resources were allocated, wherein the one or more applications are deployed on containers included in the container infrastructure.

4. The method of claim 1, further comprising:
    initializing, by the first switch device and when power is provided to the first switch device, the first switch device that is preconfigured and includes a validated operating system.

5. The method of claim 1, further comprising:
    starting, by the first switch device, a container that includes a cluster deployment and management engine on an operating system running on the first switch device; and
    initializing, by the first switch device, the cluster deployment and management engine that performs the discovering, validating, configuring, and deploying.

6. The method of claim 1, further comprising:
electing, by the first switch device, a cluster deployment and management engine, using election information received from a second switch device; and
synchronizing, by the first switch device, cluster deployment and management engine data with the second switch device.

7. The method of claim 6, further comprising:
passing, by the first switch device, control of the cluster system to a redundant cluster deployment and management engine on the second switch device using the cluster deployment and management engine data when the lifecycle management operation is performed on the first switch device.

8. An Information Handling System (IHS), comprising:
a processing system; and
a memory system that is coupled to the processing system and that includes instructions that, when executed by the processing system, cause the processing system to provide a cluster deployment and management engine that is configured to:
discover each of a plurality of node devices in a cluster system;
validate each of the plurality of node devices in the cluster system using a cluster profile;
configure each of the plurality of node devices according to the cluster profile;
deploy one or more applications and data to at least one of the node devices included in the plurality of node devices;
perform network switch functionality on data traffic transmitted between the plurality of node devices and a network;
receive, subsequent to the transmission of data traffic between the plurality of node devices and the network, a lifecycle management operation that is to-be performed on the IHS and that will cause IHS to restart; and
perform the lifecycle management operation on the IHS without having to restart or reconfigure any of the plurality of node devices in the cluster system.

9. The IHS of claim 8, wherein the cluster deployment and management engine is configured to:
perform lifecycle management operations on at least one of the node devices.

10. The IHS of claim 8, wherein the cluster deployment and management engine is configured to:
assign a role to at least one of the node devices included in the plurality of node devices;
allocate storage resources in at least one of the node devices included in the plurality of node devices to at least one application deployed on that node device; and
deploy, prior to the deploying the one or more applications and the data to the at least one of the node devices included in the plurality of node devices, a container infrastructure on the at least one of the node devices to which the storage resources were allocated, wherein the one or more applications are deployed on containers included in the container infrastructure.

11. The IHS of claim 8, wherein the cluster deployment and management engine is configured to:
elect a cluster deployment and management engine, using election information received from a redundant switch device; and
synchronize the cluster deployment and management engine data with the redundant switch device.

12. The IHS of claim 11, wherein the cluster deployment and management engine is configured to:
pass control of the cluster system to a redundant cluster deployment and management engine on the redundant switch device using the cluster deployment and management engine data when the lifecycle management operation is performed on the IHS.

13. A cluster deployment and management system, comprising:
a cluster system including a plurality of node devices; and
a first switch device that is included in the cluster system and that is coupled to a network and to each of the plurality of node devices in the cluster system, wherein the first switch device is configured to:
discover each of the plurality of node devices in the cluster system;
validate each of the plurality of node devices in the cluster system using a cluster profile;
configure each of the plurality of node devices according to the cluster profile;
deploy one or more applications and data to at least one of the node devices included in the plurality of node devices;
perform network switch functionality on data traffic transmitted between the plurality of node devices and a network;
receive, subsequent to the transmission of data traffic between the plurality of node devices and the network, a lifecycle management operation that is to-be performed on the first switch device and that will cause the first switch device to restart; and
perform the lifecycle management operation on the first switch device without having to restart and reconfigure any of the plurality of node devices in the cluster system.

14. The cluster deployment and management system of claim 13, wherein the first switch device is configured to:
perform lifecycle management operations on at least one of the node devices.

15. The cluster deployment and management system of claim 13, wherein the first switch device is configured to:
assign a role to at least one of the node devices included in the plurality of node devices;
allocate storage resources in at least one of the node devices included in the plurality of node devices to at least one application deployed on that node device; and
deploy, prior to the deploying the one or more applications and the data to the at least one of the node devices included in the plurality of node devices, a container infrastructure on the at least one of the node devices to which the storage resources were allocated, wherein the one or more applications are deployed on containers included in the container infrastructure.

16. The cluster deployment and management system of claim 13, wherein the first switch device is configured to:
initialize, when power is provided to the first switch device, the first switch device that is preconfigured and includes a validated operating system.

17. The cluster deployment and management system of claim 13, wherein the first switch device is configured to initialize a cluster deployment and management engine that performs the discovering, validating, configuring, and deploying, and wherein the initializing the cluster deployment and management engine includes:
starting a container that includes the cluster deployment and management engine on an operating system running on the first switch device.

18. The cluster deployment and management system of claim 13, further comprising:
 a second switch device that is included in the cluster system and that is coupled to the network, the first switch device, and the cluster system, wherein the first switch device is configured to:
 elect the first switch device, using election information from the second switch device, to initialize a cluster deployment and management engine that performs the discovering, validating, configuring, and deploying; and
 synchronize the cluster deployment and management engine data with the second switch device.

19. The cluster deployment and management system of claim 18, wherein the second switch device is configured to:
 detect that the first switch device is no longer available, and in response, initialize a redundant cluster deployment and management engine on the second switch device using the cluster deployment and management engine data.

20. The cluster deployment and management system of claim 19, wherein the first switch device is no longer available because the lifecycle management operation is being performed on the first switch device.

* * * * *